United States Patent
Vanderwalker et al.

(10) Patent No.: US 10,570,888 B2
(45) Date of Patent: Feb. 25, 2020

(54) WORKING PLATFORM WITHIN A NACELLE OF A WIND TURBINE

(71) Applicant: General Electric Company, Schenectady, NY (US)

(72) Inventors: Darrick Adam Vanderwalker, Pattersonville, NY (US); Brian Thomas Misavage, Ballston Spa, NY (US); Michael Frederick Sander, Colonie, NY (US); Gregory Clarence Thomas, Saratoga Springs, NY (US); Kevin Tyler Eherts, Albany, NY (US); Brian William Manikas, Schenectady, NY (US); Hunter Ryan Anderson, Muskegon, MI (US); Waylon James Esser, Canova, SD (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 15/498,682

(22) Filed: Apr. 27, 2017

(65) Prior Publication Data

US 2018/0313335 A1    Nov. 1, 2018

(51) Int. Cl.
*F03D 80/50* (2016.01)
*F03D 80/80* (2016.01)

(52) U.S. Cl.
CPC ............. *F03D 80/50* (2016.05); *F03D 80/80* (2016.05); *F05B 2230/80* (2013.01)

(58) Field of Classification Search
CPC .......... F03D 80/50; F03D 80/80; F03D 80/55; F03D 80/88; F03D 13/20; F03D 13/10; F05B 2230/80
See application file for complete search history.

(56) References Cited

U.S. PATENT DOCUMENTS

| | | | |
|---|---|---|---|
| 8,490,749 B2 | 7/2013 | Teichert | |
| 8,500,403 B2 | 8/2013 | Grabau | |
| 8,534,421 B2 | 9/2013 | Teichert | |
| 8,578,604 B2 | 11/2013 | Malaschewski | |
| 8,720,058 B2 | 5/2014 | Analis et al. | |
| 8,991,047 B2 | 3/2015 | Anasis et al. | |
| 2002/0084142 A1 | 7/2002 | Brennan et al. | |
| 2007/0025840 A1 | 2/2007 | Weaver et al. | |
| 2007/0056801 A1 | 3/2007 | Iverson | |

(Continued)

FOREIGN PATENT DOCUMENTS

| | | |
|---|---|---|
| JP | 2015-500950 A | 1/2015 |
| WO | WO2010/055278 A2 | 5/2010 |
| WO | WO2016/055068 A1 | 4/2016 |

OTHER PUBLICATIONS

International Search Report and Written Opinion issued in connection with corresponding PCT Application No. PCT/US2018/029714 dated Sep. 5, 2018.

*Primary Examiner* — George C Jin
(74) *Attorney, Agent, or Firm* — Dority & Manning, P.A.

(57) ABSTRACT

The present disclosure is directed to a working platform mounted within a nacelle of the wind turbine during a repair procedure. More specifically, the working platform may be mounted to a bedplate within the nacelle in an area where one or more drivetrain component(s) would normally be during operation of the wind turbine, but have been removed due to repair or replacement thereof.

17 Claims, 12 Drawing Sheets

(56) References Cited

U.S. PATENT DOCUMENTS

| | | | | |
|---|---|---|---|---|
| 2010/0213008 | A1* | 8/2010 | Haenisch | E06C 7/086 |
| | | | | 182/129 |
| 2010/0310375 | A1* | 12/2010 | Hanisch | F03D 13/20 |
| | | | | 416/146 R |
| 2011/0024233 | A1 | 2/2011 | Lott | |
| 2011/0271613 | A1* | 11/2011 | Hopper | E04F 11/02 |
| | | | | 52/185 |
| 2012/0025538 | A1* | 2/2012 | Luneau | B22C 7/00 |
| | | | | 290/55 |
| 2012/0282099 | A1* | 11/2012 | Munk-Hansen | B66C 23/18 |
| | | | | 416/146 R |
| 2013/0089433 | A1* | 4/2013 | Mercado Diez | F03D 80/00 |
| | | | | 416/244 R |
| 2015/0285218 | A1* | 10/2015 | Christoffersen | F03D 80/50 |
| | | | | 415/208.1 |

* cited by examiner

WORKING PLATFORM WITHIN A NACELLE OF A WIND TURBINE

FIELD OF THE INVENTION

The present subject matter relates generally to wind turbines, and more particularly to working platforms that provide working surfaces within a nacelle of a wind turbine during repair procedures.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate member support frame located within the nacelle. More specifically, in many wind turbines, the gearbox is mounted to the bedplate member via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the rotor blades, which spin a low speed shaft, i.e. the main shaft. The main shaft is coupled to an input shaft of the gearbox, which has a higher speed output shaft connected to the generator. Thus, the geared drivetrain aims to increase the velocity of the mechanical motion. Further, the main shaft is typically externally supported by one or more bearings. In addition, the gearbox and the generator are mounted to the bedplate member via one or more torque arms or supports.

Over time, the main shaft and associated bearings may become worn and/or damaged due to loads and forces from the wind acting on the wind turbine components. Unfortunately, repair of main shaft and the main bearings often requires the turbine machine head to be removed from atop the nacelle and transported to a factory, which can be very time-consuming and expensive. Even still, if such repairs are made uptower, the nacelle has minimal space and/or working surfaces therein, thereby making it difficult for personnel to complete the needed tasks.

Accordingly, the present disclosure is directed to working platforms that provide working surfaces within a nacelle of a wind turbine during repair procedures.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a housing assembly for a wind turbine. The housing assembly includes a nacelle having a base wall, side walls, a front wall, a rear wall, and a top lid. The base wall includes an opening for coupling the nacelle with a tower. More specifically, a yaw bearing may be positioned in the opening of the base wall, with the yaw bearing being coupled to the tower. The housing assembly also includes a bedplate arranged within the nacelle. The bedplate includes one or more areas configured to receive at least one drivetrain component, such as, e.g. a main shaft, a main bearing, a gearbox, a generator shaft, a generator, or similar. Further, the housing assembly includes at least one working platform secured within the nacelle in at least one of the openings or the areas, i.e. wherein the drivetrain component(s) would normally be during operation of the wind turbine.

In one embodiment, the working platform(s) may include a working surface mounted atop a platform frame. Thus, in certain embodiments, the platform frame sits within one of the openings or one of the areas such that the working surface is flush with the bedplate, thereby creating a safe and sturdy work area for personnel.

In another embodiment, the platform frame may also include one or more locking features configured to secure the working platform within at least one of the openings or the areas.

In further embodiments, the housing assembly may include a plurality of platforms, including, for example, a first platform secured within the opening of the base wall and a second platform secured within one of the areas of the bedplate where the drivetrain component has been removed.

In additional embodiments, the working platform(s) may include a manhole covered by a safety door movably coupled to the working platform, e.g. via one or more hinges. Further, the working platform(s) may include one or more lifting devices. Moreover, the working platform(s) may include at least one additional feature configured to receive an emergency escape device. The additional feature may include a hole, slit, slot, recess, or anchor location, whereas the emergency escape devices may include a ladder, one or more cables, a harness, first aid equipment, and/or any other emergency personnel escape devices.

In particular embodiments, the working platform(s) may be constructed of any suitable material. For example, in certain embodiments, the working platform(s) may be constructed of a material configured to support a weight of at least 500 pounds per square feet (lbs/ft$^2$). Such material may include but are not limited to aluminum, wood, steel, a composite material, or combinations thereof.

In another aspect, the present disclosure is directed to a disassembled wind turbine under repair. The wind turbine includes a tower secured to a foundation, a nacelle mounted atop the tower, and a bedplate arranged within the nacelle. The nacelle includes a base wall, side walls, a front wall, a rear wall, and a top lid. The base wall includes an opening for coupling the nacelle with the tower. The bedplate includes one or more areas configured to receive at least one drivetrain component (although in the disassembled wind turbine, one or more of the drivetrain components have been removed). As such, the wind turbine includes at least one working platform secured within the nacelle in at least one of the openings or the areas (i.e. where the removed drivetrain components used to be). It should be understood that the wind turbine may further include any of the additional step and/or features as described herein.

In yet another aspect, the present disclosure is directed to a method for preparing a wind turbine for an uptower repair procedure. The method includes removing at least one drivetrain component supported by a bedplate of the wind turbine from within of a nacelle of the wind turbine and installing at least one working platform within the nacelle at a location of the removed drivetrain component.

In one embodiment, the step of installing the at least one working platform within the nacelle at the location of the removed drivetrain component may include fitting the working platform into the location via one or more locking features thereof.

In another embodiment, the step of removing at least one drivetrain component supported by the bedplate of the wind turbine from within of the nacelle of the wind turbine may reveal an opening in a base wall of the nacelle. As such, the method may further include covering the opening in the base wall of the nacelle with the at least one working platform. It should be understood that the method may further include any of the additional step and/or features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
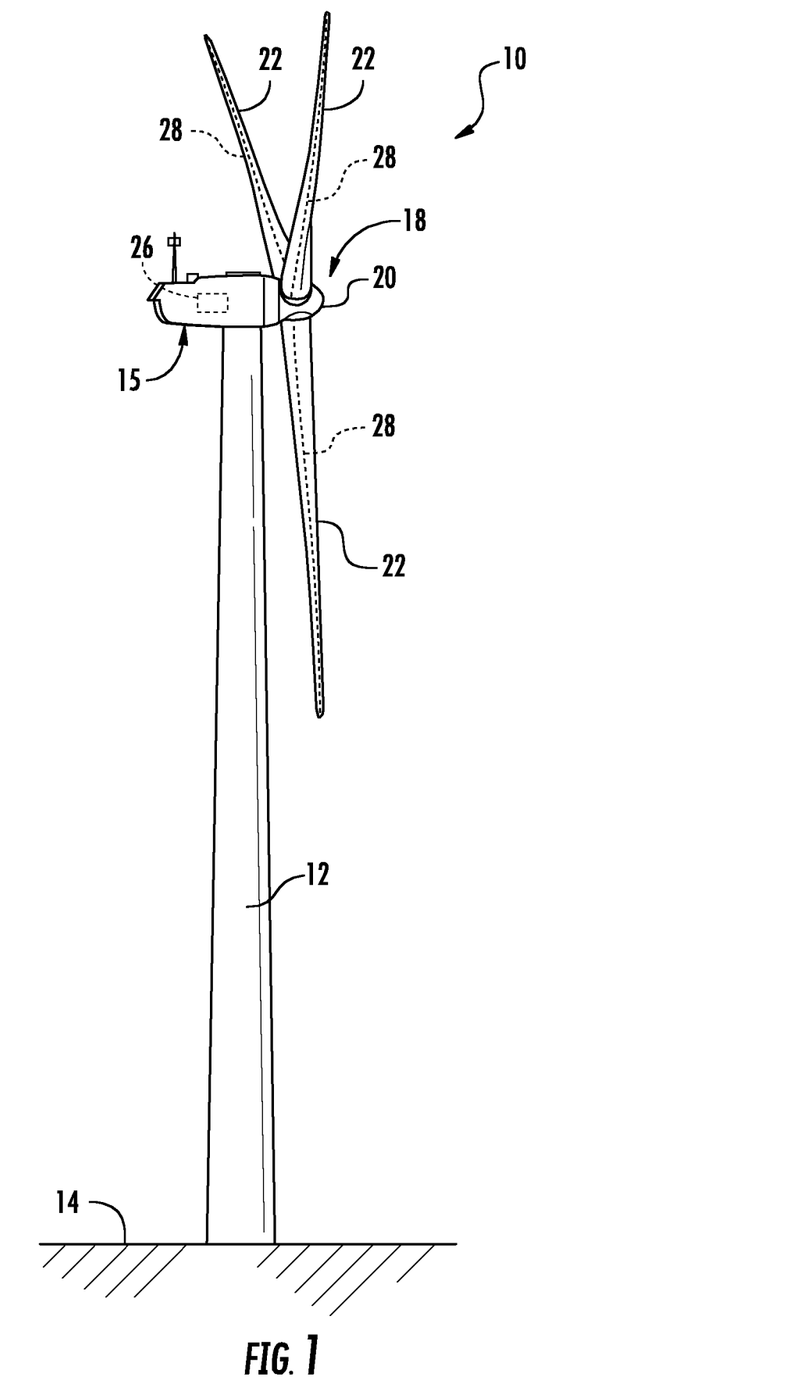
FIG. 1 illustrates a perspective view of one embodiment of a wind turbine according to the present disclosure.
Figure 3:
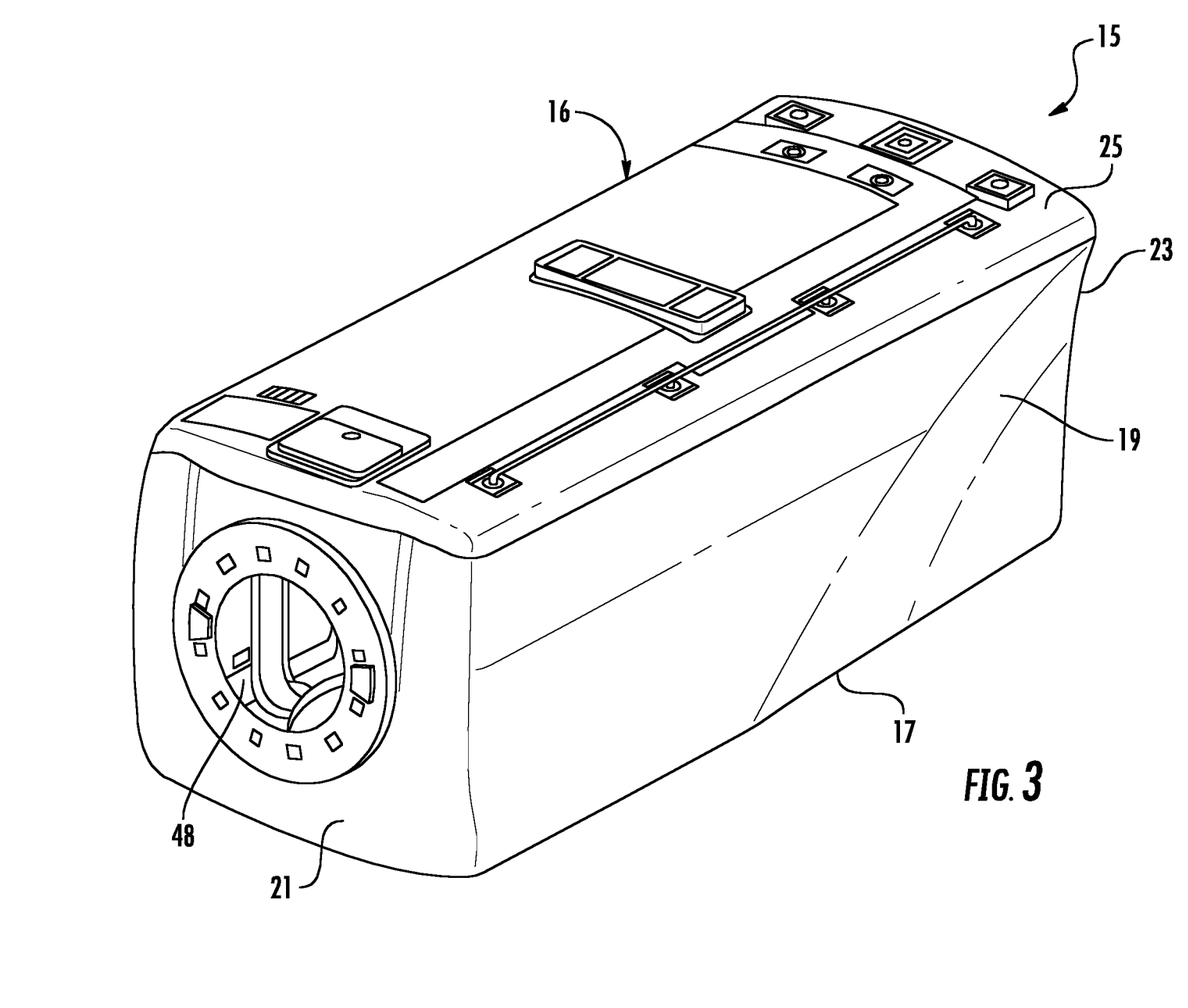
FIG. 3 illustrates a perspective view of one embodiment of a housing assembly of a wind turbine including the nacelle and a bedplate thereof according to the present disclosure.
Figure 4:
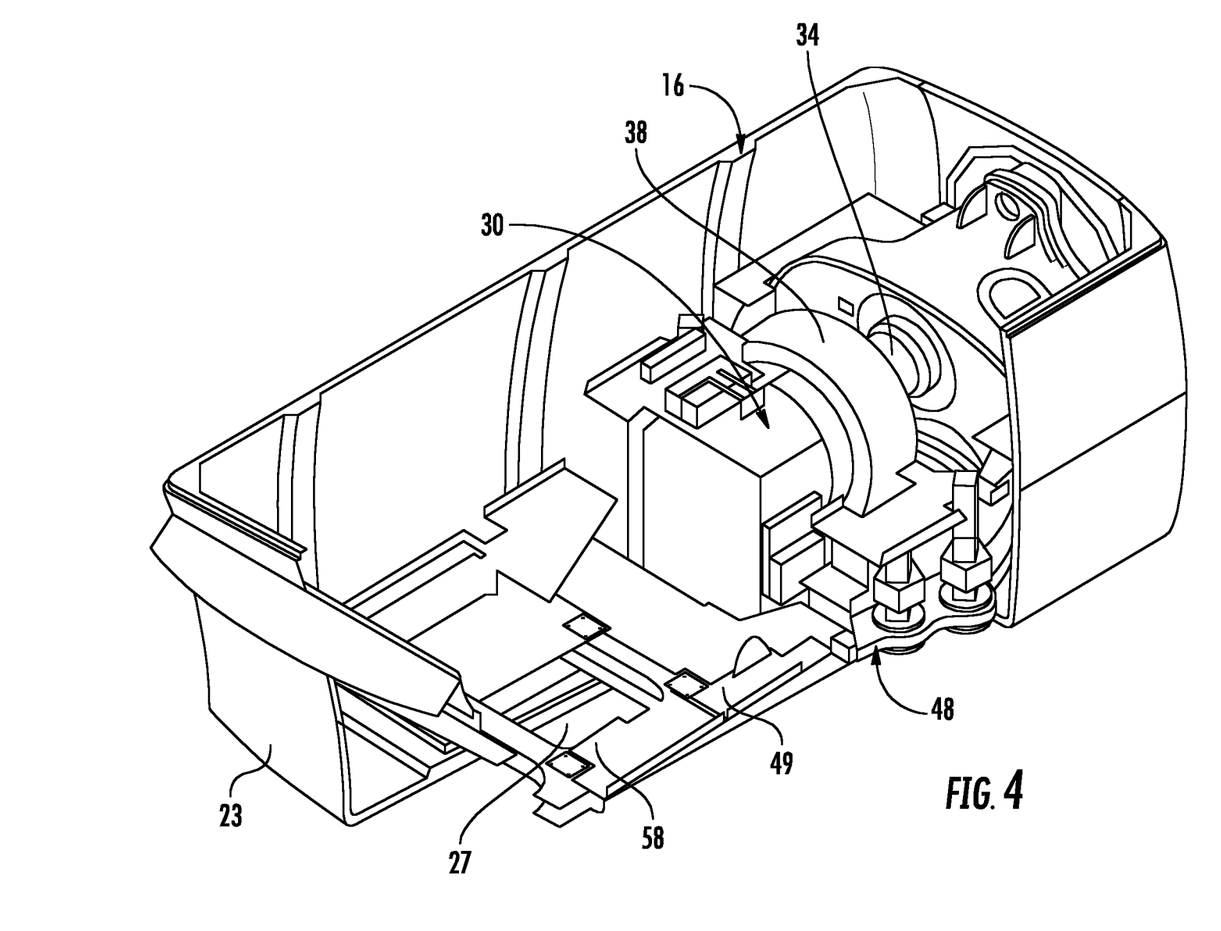
FIG. 4 illustrates a simplified, internal view of one embodiment of a nacelle of a wind turbine according to the present disclosure, particularly illustrating the nacelle during a repair procedure where the generator has been removed.
Figure 5:
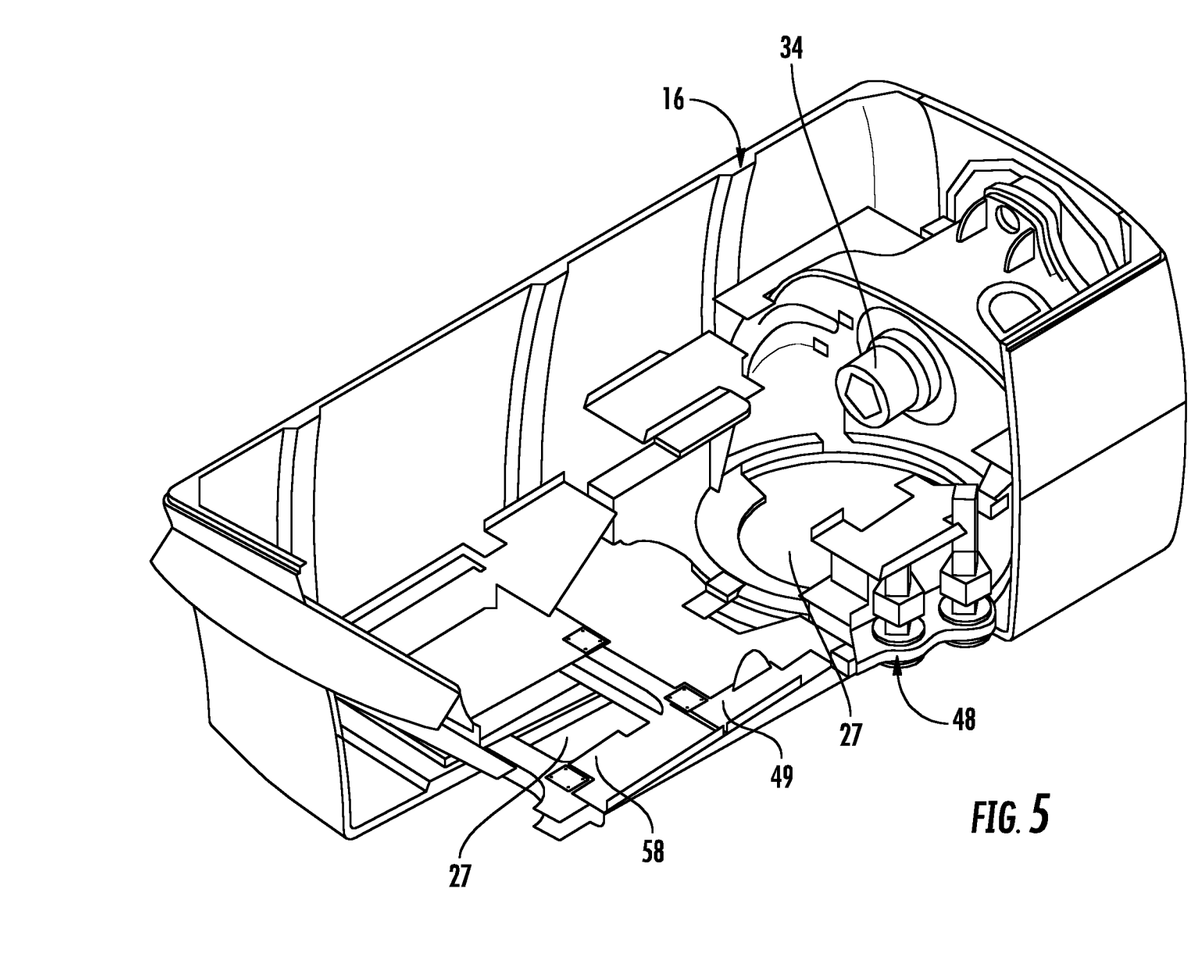
FIG. 5 illustrates a simplified, internal view of one embodiment of a nacelle of a wind turbine according to the present disclosure, particularly illustrating the nacelle during a repair procedure where the generator and the gearbox have been removed.

Referring now to the drawings, FIG. 1 illustrates a perspective view of one embodiment of a wind turbine 10 according to the present disclosure. As shown, the wind turbine 10 generally includes a tower 12 extending from a support surface 14, a housing assembly 15 mounted on the tower 12, and a rotor 18 coupled to the housing assembly 15. More specifically, as shown particularly in FIG. 3, the housing assembly 15 may include a nacelle 16 and a bedplate 48 arranged within the nacelle 16. As such, the nacelle 16 corresponds to the overall housing structure and has a base wall 17, opposing side walls 19, a front wall 21, a rear wall 23, and a top lid 25. Further, as shown in FIGS. 4 and 5, the base wall 17 may include one or more openings 27. For example, one of the openings 27 may be provided for coupling the nacelle 16 with the tower 12. More specifically, as shown, a yaw bearing 54 may be positioned in the opening 27 of the base wall 17 or adjacent thereto, with is coupled to the tower 12 and allows for rotation of the nacelle 16 with respect to the wind, which is discussed in more detail below. Alternatively, the openings 27 may be at any other location in the base wall 17, e.g. to accommodate the various drivetrain components configured therein.

Referring back to FIG. 1, the rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced. In particular embodiments, as shown in FIGS. 4 and 5, a generator frame 49 may also be secured to the bedplate 48 (e.g. via a bolted connection) for supporting the generator 24.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
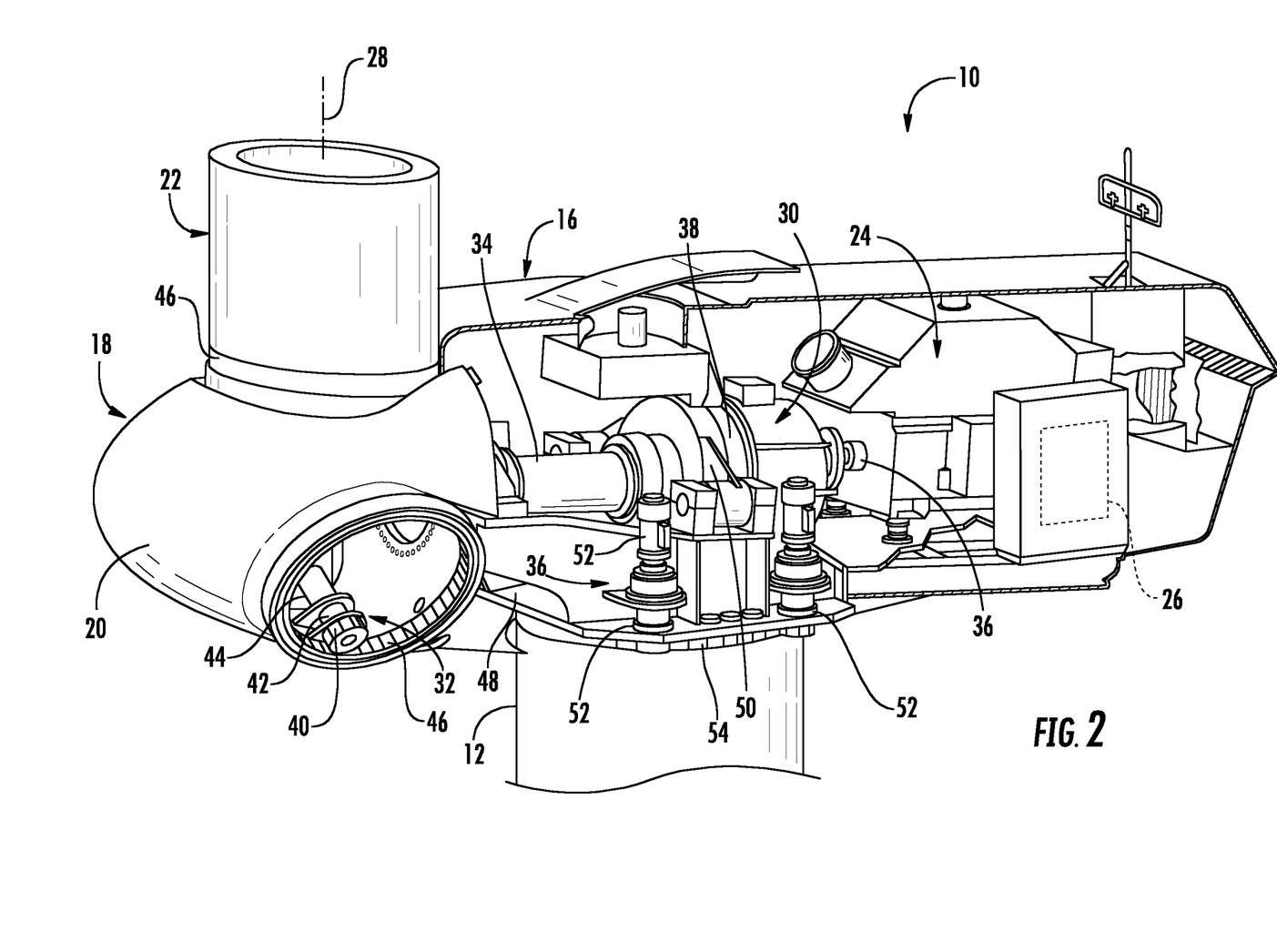
FIG. 2 illustrates a simplified, internal view of one embodiment of a nacelle of a wind turbine according to the present disclosure, particularly illustrating the nacelle during normal operation.

Referring now to FIG. 2, a simplified, internal view of one embodiment of the nacelle 16 of the wind turbine 10 shown in FIG. 1, particularly illustrating the drivetrain components thereof, is illustrated. The drivetrain components described herein may include any one of or combination of a main shaft, a main bearing, a gearbox, a generator shaft, a generator, or similar. Further, as shown, the generator 24 may be coupled to the rotor 18 for producing electrical power from the rotational energy generated by the rotor 18. The rotor 18 may include a main shaft 34 rotatable via a main bearing (not shown) coupled to the hub 20 for rotation therewith. The main shaft 34 may, in turn, be rotatably coupled to a gearbox output shaft 36 of the generator 24 through a gearbox 30. The gearbox 30 may include a gearbox housing 38 that is connected to the bedplate 48 by one or more torque arms 50. In other words, the bedplate 48 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 52 communicatively coupled to the controller 26, with each yaw drive mechanism(s) 52 being configured to change the angle of the nacelle 16 relative to the wind (e.g., by engaging a yaw bearing 54 of the wind turbine 10).

During operation of the wind turbine 10, the various drivetrain components may become worn and/or damaged due to operating loads and forces from the wind acting on the wind turbine components. As such, the damaged drivetrain components are typically removed from or relocated in the nacelle 16. For example, as shown in FIG. 4, a partial internal view of one embodiment of the nacelle 16 is illustrated with the generator 24 removed. In addition, as shown in FIG. 5, a partial internal view of another embodiment of the nacelle 16 is illustrated with the generator 24 and the gearbox 30 removed. Thus, as shown in FIGS. 4 and 5, removal of such drivetrain components can create hazardous openings where the components were once located. In addition, the bedplate frame 48 is typically shaped and designed for the drivetrain components and does not provide a safe and even working surface.

Figure 6:
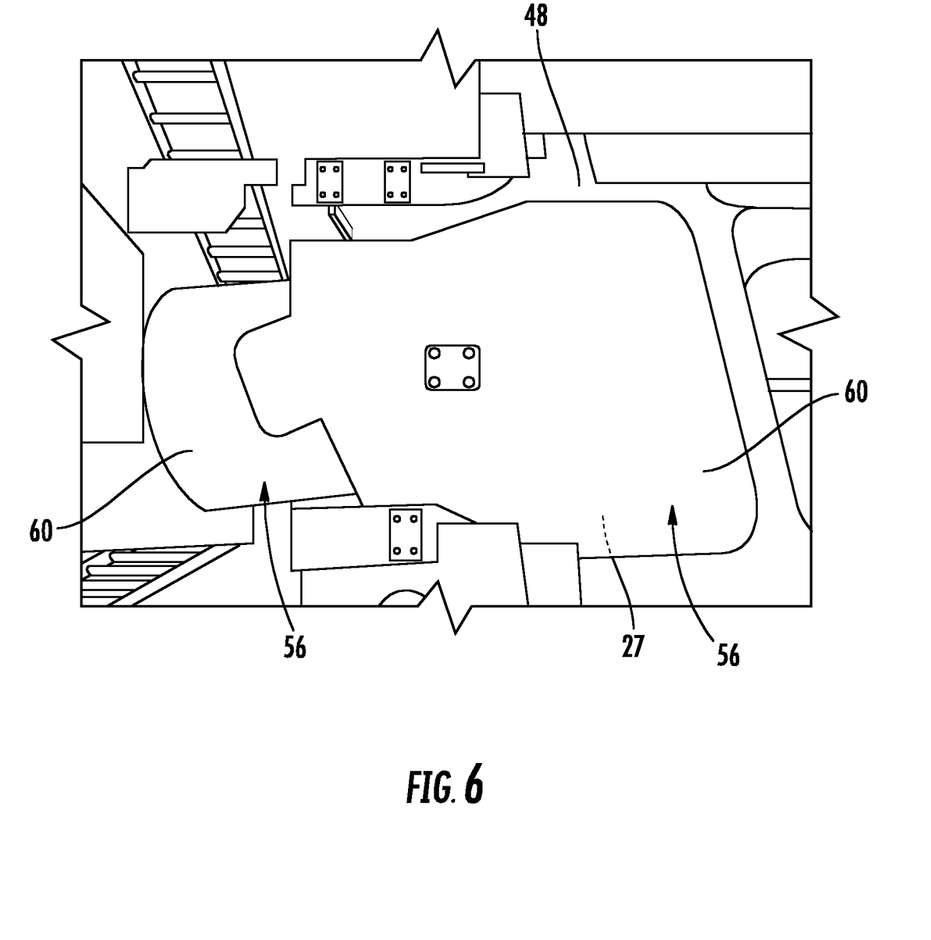
FIG. 6 illustrates a detailed view of a portion of a bedplate of a nacelle of a wind turbine according to the present disclosure, particularly illustrating multiple working platforms covering a hole left by removal of a gearbox of the wind turbine.

As such, the present disclosure is directed to working platforms 56 that are installed within the nacelle 16 in the locations where the drivetrain components have been moved or removed so as to provide safe working spaces therein. For example, as shown in FIGS. 6-11, various views of a working platform 56 according to the present disclosure are illustrated. FIG. 5, in particular, illustrates an area 58 of the generator frame 49 where a drivetrain component (e.g. the generator 24) has been removed. More specifically, as shown in FIG. 4, by removing the generator 24, one of the openings 27 in the base wall 17 of the nacelle 16 is exposed, thereby creating a potentially hazardous fall hazard for personnel. Thus, as shown in FIG. 6, the opening 27 has been covered with multiple working platforms 56 according to the present disclosure. More specifically, as shown, two working platforms 56 having the shapes illustrated in FIGS. 7 and 9 have been arranged together to cover the opening 27. Thus, as shown, at least two platforms may be secured within the opening 27 of the base wall 17 (i.e. where the gearbox 30 used to sit) and an additional platform may be secured within one of the openings 27 where the generator 24 used to sit (i.e. near area 58 of FIG. 4). In addition, it should be understood that any number of working platforms 56 may be utilized to create a safe working space within the nacelle 16.

Figure 7:
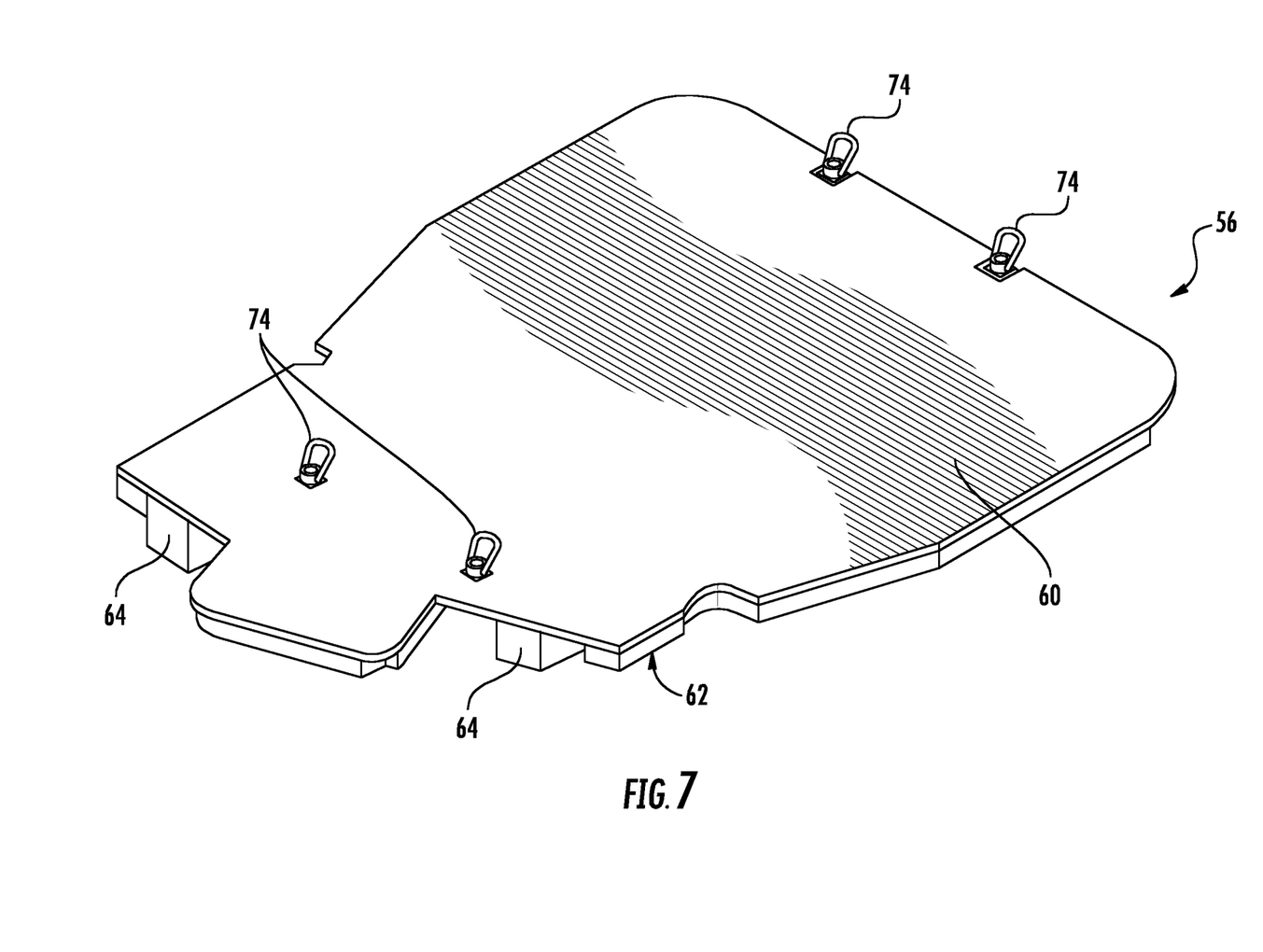
FIG. 7 illustrates a perspective view of one embodiment of a working platform according to the present disclosure, particularly illustrating a working surface of the working platform mounted atop a platform frame thereof.
Figure 8:
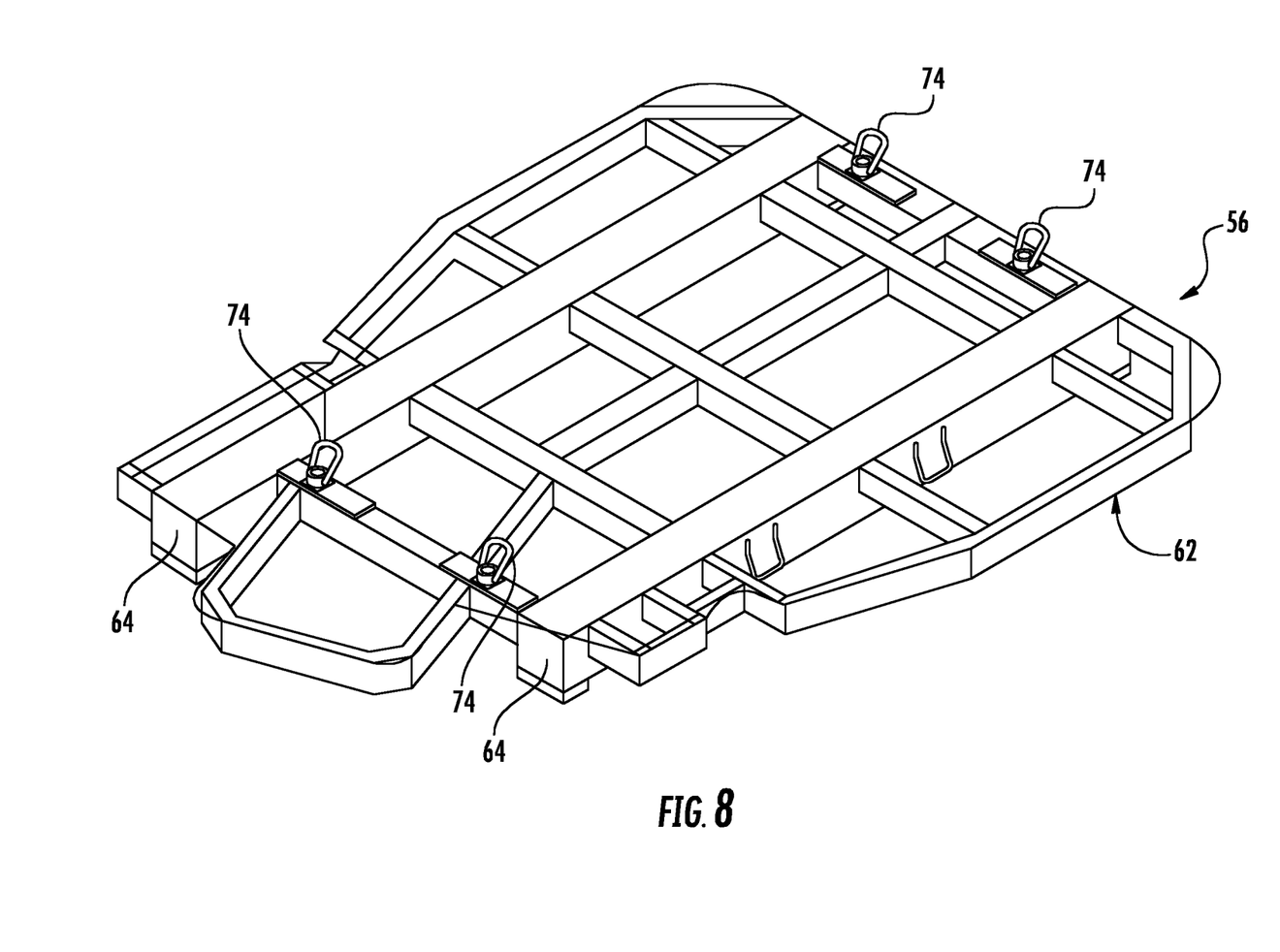
FIG. 8 illustrates a perspective view of the working platform of FIG. 7 with the working surface thereof removed to further illustrate details of the platform frame.

Referring generally to FIGS. 6-11, various embodiments of the working platforms 56 of the present disclosure are illustrated. For example, as shown, the working platform(s) 56 may include a working surface 60 mounted atop an optional platform frame 62. Further, as shown particularly in FIG. 8, the platform frame 62 may include any suitable beam structure having any number of columns, and beams, girders, spandrels, and trusses connected to one another and to the columns, so as to provide the desired strength to the working surface 60. In addition, as shown in the embodiment illustrated in FIG. 6, the platform frame 62 may be configured to sit within one of the openings (i.e. opening 27) of the bedplate 48 where the drivetrain component has been removed such that the working surface 60 is flush with the bedplate 48, thereby creating a safe and sturdy work area for personnel. In another embodiment, as shown in FIGS. 7 and 8, the platform frame 62 may also include one or more locking features 64 configured to secure the working platform 56 within at least one of the openings 27. For example, as shown, the locking features 64 may correspond to feet that sit within and lock to the bedplate 48, e.g. via an interference fit and/or by securing the locking features 64 via one or more fasteners.

Figure 9:
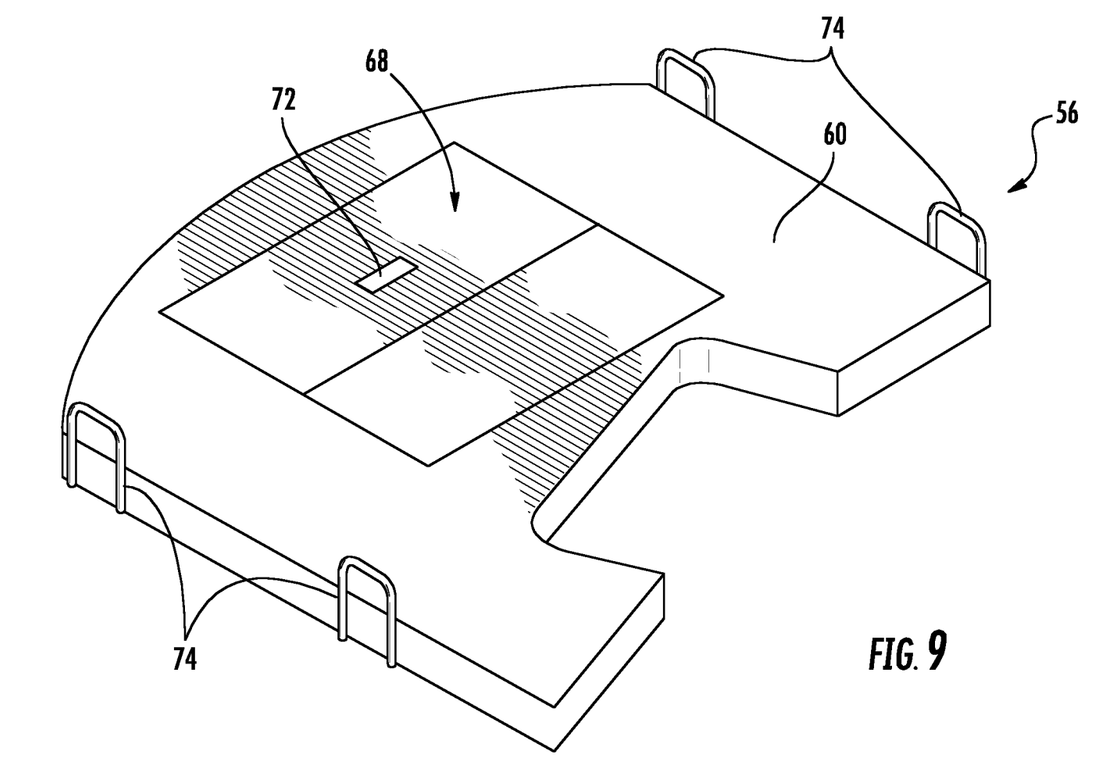
FIG. 9 illustrates a perspective view of another embodiment of a working platform according to the present disclosure, particularly illustrated a safety door the platform in a closed position.
Figure 10:
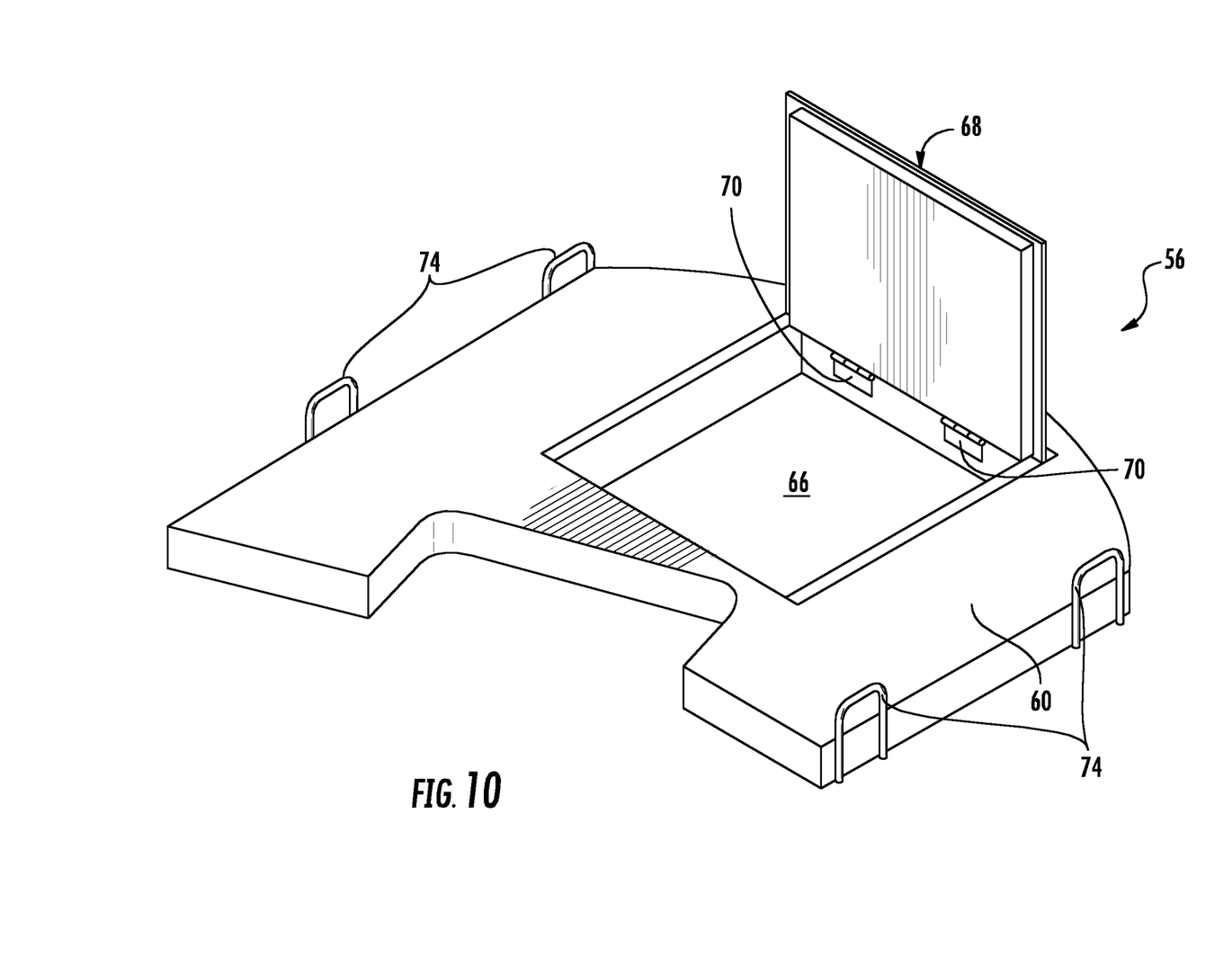
FIG. 10 illustrates a perspective view of another embodiment of a working platform according to the present disclosure, particularly illustrated a safety door the platform in an open position.

Referring to FIGS. 8 and 9, the working platform(s) 56 may also include a manhole 66 covered by a safety door 68 movably coupled to the working platform 56, e.g. via one or more hinges 70. Thus, as shown, the safety door 68 can be moved between a closed position (FIG. 9) and an open position (FIG. 10) to allow personnel to pass therethrough. In addition, the manhole 66 provides an aperture for a ladder, such as an escape ladder (not shown), to fit therethrough. Moreover, as shown in FIG. 9, the safety door 68 may also include a handle 72 for easily changing the position of the door 68. In additional embodiments, the working platform(s) 56 may further include any additional features configured to receive various emergency escape devices. For example, the additional features may include a hole, slit, slot, recess, or anchor location, whereas the emergency escape devices may include a ladder, one or more cables, a harness, first aid equipment, and/or any other emergency personnel escape devices.

Figure 11:
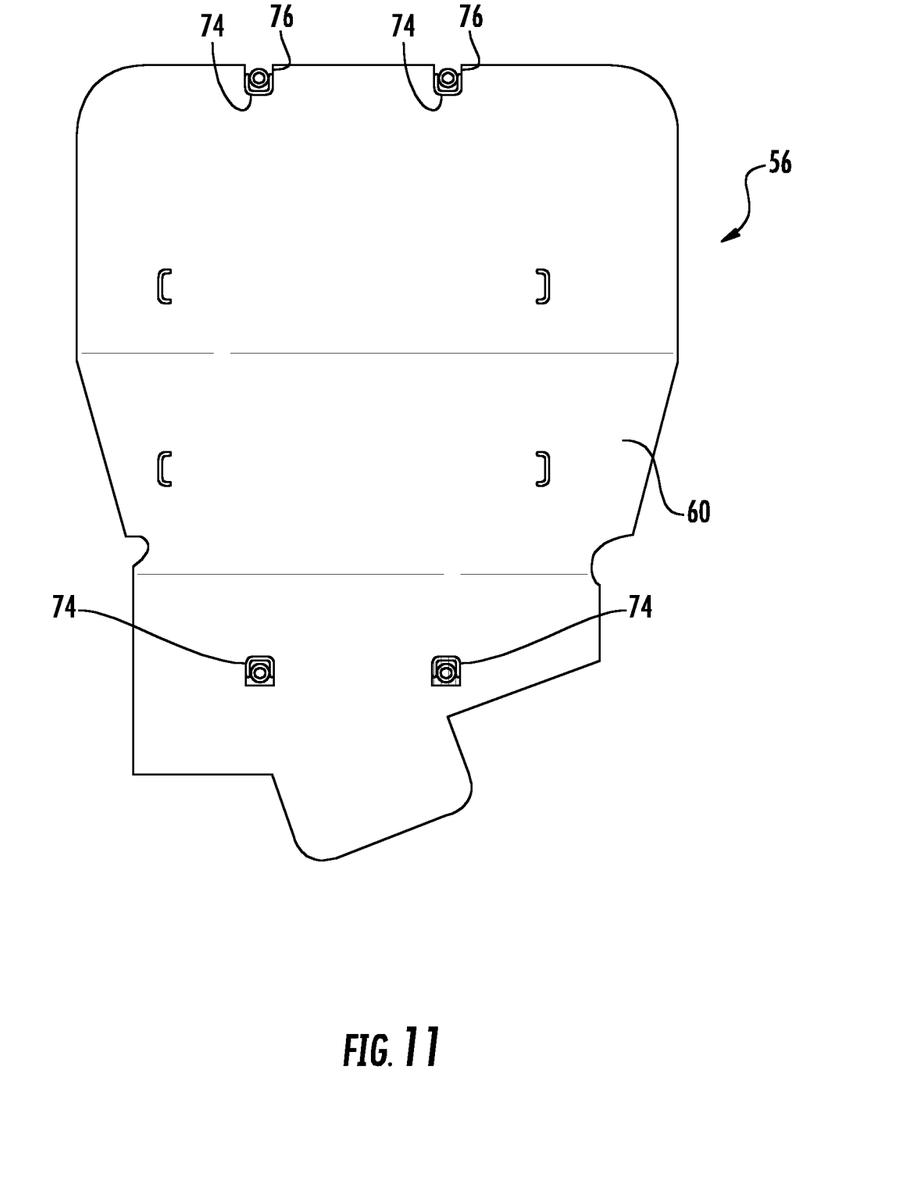
FIG. 11 illustrates a top view of one embodiment of a working platform according to the present disclosure.

In additional embodiments, as shown in FIGS. 7-11, the working platform(s) 56 may include one or more lifting devices 74. For example, as shown in FIGS. 7, 8, and 11, the lifting devices 74 correspond to hoist rings. Alternatively, as shown in FIGS. 9 and 11, the lifting devices 74 may correspond to D-rings. As such, one or more cables may be secured to the lifting devices 74 for easily lifting and lowering the working platform(s) 56 uptower. Further, the lifting devices 74 may be mounted (e.g. via welding or bonding) to the working surface 60 of the platform 56 or the platform frame 62. In addition, as shown particularly in FIG. 11, one or more of the lifting devices 74 may be secured to the edge of the working platform 56, e.g. within a groove 76 or notch formed therein. Alternatively, the lifting device(s) 74 may be clamped to the edges of the working platform 56.

In further embodiments, the working platform 56 of the present disclosure may also be configured with additional features such as hole(s), slot(s), or similar e.g. in the working surface 60 and/or the platform frame 62 to allow one or more cables to pass therethrough. As such, the cables may be used for easily lifting and lowering the working platform(s) 56 uptower.

It should also be understood that the working platform(s) 56 described herein may be constructed of any suitable material and may have any desired shape. For example, in certain embodiments, the working platform(s) 56 may be constructed of a material configured to support any suitable weight. More specifically in one embodiment, the working platform 56 may support a weight of at least 500 lbs/ft$^2$. Such materials may include but are not limited to aluminum, wood, steel, a composite material, or combinations thereof. Alternatively, the working platform 56 may support a weight of less than 500 lbs/ft$^2$. Further, as shown, the shape of the working platforms 56 may be desired to generally correspond to the shape of the hole or opening that the platform 56 is covering.

Figure 12:
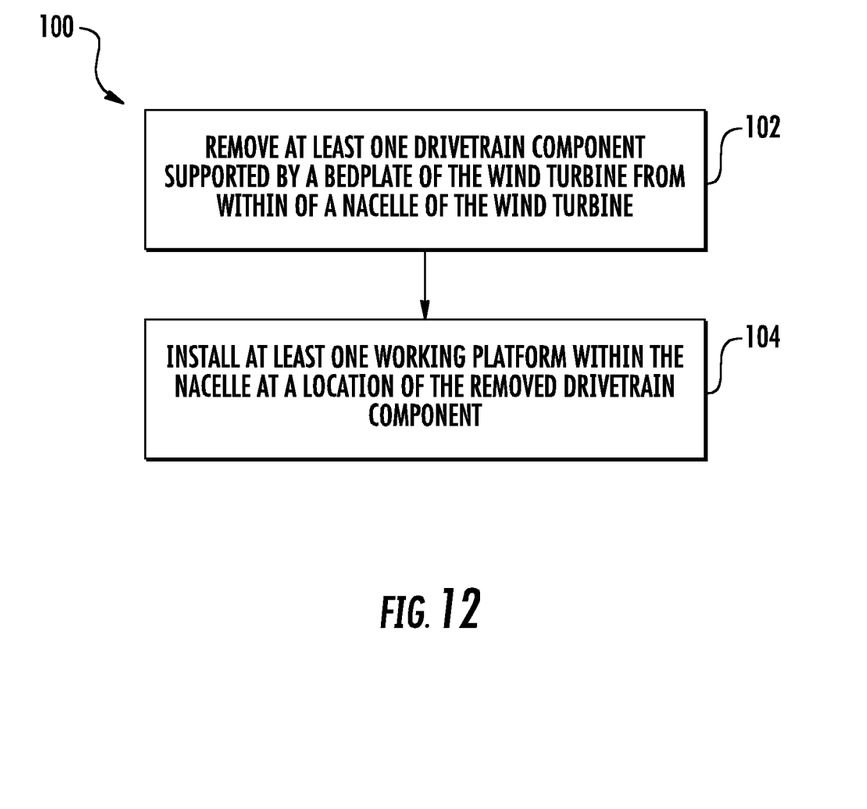
FIG. 12 illustrates a flow diagram of one embodiment of a method for preparing a wind turbine for an uptower repair procedure.

Referring now to FIG. 12, a flow diagram of one embodiment of a method 100 for preparing a wind turbine, such as the wind turbine 10 of FIG. 1, for an uptower repair procedure is illustrated. As shown at 102, the method 100 includes removing at least one drivetrain component supported by the bedplate 48 of the wind turbine 10 from within of the nacelle 16 of the wind turbine 10. In one embodiment, the step of removing at least one drivetrain component supported by the bedplate 48 of the wind turbine 10 from within of the nacelle 16 may reveal an opening 27, e.g. in the base wall 17 of the nacelle 16. As such, the method 100 may further include covering the opening 27 in the base wall 17 of the nacelle 16 with the at least one working platform 56. As shown at 104, the method 100 includes installing at least one working platform 56 within the nacelle 16 at a location of the removed drivetrain component. More specifically, in one embodiment, the step of installing the working platform(s) 56 within the nacelle 16 at the location of the removed drivetrain component may include fitting the working platform 56 into the location via one or more locking features thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A housing assembly for a wind turbine, comprising:
   a nacelle comprising a base wall, side walls, a front wall, a rear wall, and a top lid, the base wall defining a base wall opening for coupling the nacelle with a tower;
   a bedplate arranged within the nacelle, the bedplate comprising one or more areas configured to receive and support at least one drivetrain component, wherein the one or more areas define at least one bedplate opening uncovered by an absence of the at least one drivetrain component; and,
   at least one working platform secured within the nacelle in the at least one bedplate opening uncovered by the absence of the at least one drivetrain component.

2. The housing assembly of claim 1, wherein the at least one working platform comprises a working surface mounted atop a platform frame.

3. The housing assembly of claim 2, wherein the platform frame sits within the at least one bedplate opening such that the working surface is flush with the bedplate.

4. The housing assembly of claim 3, wherein the platform frame comprises one or more locking features configured to secure the working platform within the at least one bedplate opening.

5. The housing assembly of claim 1, wherein the at least one working platform is a first working platform, the housing assembly further comprising a second platform secured within the base wall opening.

6. The housing assembly of claim 1, wherein the at least one working platform comprises a manhole covered by a safety door movably coupled to the working platform.

7. The housing assembly of claim 1, wherein the at least one working platform comprises one or more lifting devices.

8. The housing assembly of claim 1, wherein the at least one working platform comprises at least one additional feature configured to receive an emergency escape device, the additional feature comprising at least one of a hole, slit, slot, recess, or anchor location, the emergency escape devices comprising at least one of a ladder, one or more cables, a harness, or first aid equipment.

9. The housing assembly of claim 1, wherein the at least one working platform is constructed of a material configured to support a weight of at least 500 pounds per square feet, wherein the material comprises at least one of aluminum, wood, steel, a composite material, or combinations thereof.

10. The housing assembly of claim 1, wherein the drivetrain components comprise at least one of a main shaft, a main bearing, a gearbox, a generator shaft, or a generator.

11. The housing assembly of claim 1, further comprising a yaw bearing positioned in the base wall opening, the yaw bearing being coupled to the tower.

12. A disassembled wind turbine under repair, comprising:
   a tower secured to a foundation;
   a nacelle mounted atop the tower, the nacelle comprising a base wall, side walls, a front wall, a rear wall, and a top lid, the base wall defining a base wall opening for coupling the nacelle with the tower;
   a bedplate arranged within the nacelle, the bedplate comprising one or more areas configured to receive and support at least one drivetrain component, wherein the one or more areas define at least one bedplate opening uncovered by the absence of the at least one drivetrain component; and, at least one working platform secured within the nacelle in at least one bedplate opening uncovered by the absence of the at least one drivetrain component.

13. The wind turbine of claim 12, wherein the at least one working platform comprises a working surface mounted atop a platform frame.

14. The wind turbine of claim 13, wherein the platform frame sits within the at least one bedplate opening such that the working surface is flush with the bedplate.

15. The wind turbine of claim 4, wherein the platform frame comprises one or more locking features configured to secure the working platform within the at least one or more areas of the bedplate.

16. The wind turbine of claim 12, wherein the at least one working platform comprises a manhole covered by a safety door movably coupled to the working platform.

17. The wind turbine of claim 12, wherein the at least one working platform comprises one or more lifting devices.

* * * * *